United States Patent
Kuroda et al.

(10) Patent No.: US 6,524,763 B1
(45) Date of Patent: Feb. 25, 2003

(54) MICROCAPSULES CONTAINING A RADIATION SENSITIVE COMPOSITION AND THEIR USE

(75) Inventors: Yuji Kuroda, Tokyo (JP); Masahiko Seki, Tokyo (JP); Yumiko Fujita, Tokyo (JP); Mitsuto Montani, Tokyo (JP); Takeshi Sakai, Izumiotsu (JP); Shozo Suefuku, Kyoto (JP); Hiroyuki Nakazumi, Kawachinagano (JP)

(73) Assignees: The Japan Atomic Power Company, Tokyo (JP); Nuclear Fuel Industries, Ltd., Tokyo (JP)

( * ) Notice: Subject to any disclaimer, the term of this patent is extended or adjusted under 35 U.S.C. 154(b) by 152 days.

(21) Appl. No.: 09/797,447

(22) Filed: Mar. 1, 2001

(30) Foreign Application Priority Data

Mar. 1, 2000 (JP) ........................................ 2000-060379

(51) Int. Cl.$^7$ .............................. G03C 1/72; B32B 15/02
(52) U.S. Cl. ............. 430/138; 428/402.21; 428/402.24; 428/403; 428/423.1; 428/423.7; 430/106; 430/110; 430/127; 430/135; 430/154; 430/155; 430/170
(58) Field of Search ....................... 428/402.21, 402.24, 428/403, 423.1, 423.7; 430/106, 110, 127, 135, 138, 154, 155, 170

(56) References Cited

U.S. PATENT DOCUMENTS 5,206,118 A * 4/1993 Sidney et al. ............ 250/474.1

FOREIGN PATENT DOCUMENTS

JP (B) 49-28449 7/1947

* cited by examiner

Primary Examiner—Samuel A. Acquah
(74) Attorney, Agent, or Firm—Dinnin & Dunn, P.C.

(57) ABSTRACT

The object of the present invention is to provide a material which takes on a color or which changes its colors when selectively sensitized by ionizing radiation (especially by low doses of radiation) and which is not sensitive to visible and ultraviolet light etc.

This is achieved by microcapsules containing a radiation sensitive composition comprising leuco compounds (a) and organic halogen compounds (b) as indispensable components.

121 Claims, 1 Drawing Sheet

MICROCAPSULES CONTAINING A RADIATION SENSITIVE COMPOSITION AND THEIR USE

SUMMARY OF THE INVENTION

1. Field of the Invention

The present invention relates to microcapsules containing a radiation sensitive composition ideal for use in industrial fields which require the detection of ionizing radiation, and to various methods of using these microcapsules.

2. Description of the Prior Art

Attempts to detect radiation by using various compounds which, sensitized by radiation, take on a color or change their color have been made for many years. E.g., compositions made from free radical generators and leuco compounds having a specific structure etc. are known, as one such attempt, from JP, 49-28449, B.

Even though these conventional compositions have the property of taking on a color when sensitized by radiation, there was a problem that, apart from ionizing radiation, they were also sensitized and took on a color when exposed to ultraviolet light, visible light and other types of irradiations.

Consequently, these compositions were not used as a very reliable means for detecting ionizing radiation, since it was not possible to instantly judge, only by confirming the state of coloration, whether or not a coloration was actually caused by ionizing radiation, and since there was a possibility of an accidental exposure to radiation due to a wrong judgment, it was in no way possible to use them for applications having to do with the safety of human beings.

When, in order to solve this problem, these compositions were made so that they are selectively sensitive only to ionizing radiation and non-sensitive (i.e., stabilized) to visible and ultraviolet light, there arose the inevitable technical problem that only extremely high radiation doses are detected and low amounts of radiation remain undetected.

Hence, the present state of affairs is that, despite strong demands from different industries, materials which take on color or which change their colors only when selectively sensitized by ionizing radiation (especially by low doses of radiation) and which are not sensitized by visible and ultraviolet light etc. are still not known.

OBJECT OF THE INVENTION

Thus, having reflected this situation, it is the object of the present invention to provide a means for solving the problems described above by discovering a material which takes on a color or which changes its colors only when selectively sensitized by ionizing radiation (especially by low doses of radiation) and which is not sensitized by visible and ultraviolet light etc.

MEANS FOR ACHIEVING THE OBJECT

As a result of an extensive research to solve the above-mentioned problems, the inventors of the present invention have gained the knowledge that, if a specific radiation sensitive composition is microencapsulated, it can be selectively sensitized by ionizing radiation while remaining non-sensitive to ultraviolet and visible light, and have finally completed the invention by conducting further research based on this knowledge.

I.e., the present invention has the following constitutions:

1. Microcapsules containing a radiation sensitive composition comprising leuco compounds (a) and organic halogen compounds (b) as indispensable components.

2. Microcapsules containing a radiation sensitive composition comprising leuco compounds (a) and halogen compounds (b) as indispensable components, and further an organic solvent (c) and/or an antioxidant (d).

3. Microcapsules according to 1 or 2 above wherein the leuco compounds (a) are at least one member selected from the group consisting of triphenylmethane phthalides, fluorans, phenothiazines, phenazines, indolyl phthalides, leuco olamins, spiropyrans, spiro phthalans, spironaphthoxazines, naphthopyrans, rhodamine lactams, rhodamine lactons, indolines, diphenylmethanes, triphenylmethanes, azaphthalides, triazenes, chromeno indoles, xanthenes, diacetylenes, naphtholactams and azomethines.

4. Microcapsules according to 1, 2 or 3 above wherein the leuco compounds (a) are at least one member selected from the group consisting of Compounds 3 and 4 below;

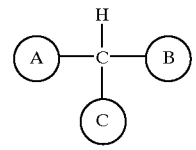

Compound 3

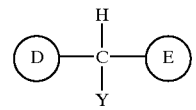

Compound 4 wherein each of the rings A, B, C, D, E represents 5 or 6 membered aromatic or heterocyclic rings which may have a substituent group, one or more aromatic or heterocyclic rings may be condensed, and each of the rings may be cross-linked by O, N or S. Further, Y exists when the central carbon is not conjugated with the D or the E ring, and represents hydrogen, a hydroxy group, an alkoxy group or an aryloxy group.

5. Microcapsules according to 1, 2, 3 or 4 above wherein the organic solvent (c) is at least one member selected from the group consisting of alcohols, esters and aromatic hydrocarbons.

6. Microcapsules according to 1, 2, 3, 4 or 5 above wherein the microcapsules take on a color or change their colors when sensitized by dose levels of radiation in the range from 0.001 to 20000 Gy.

7. Radiation sensitive ink or paint containing the microcapsules according to any of 1 to 6 above.

8. A radiation detecting method for detecting whether a substrate onto which the ink or paint according to 7 above has been printed or painted is exposed to radiation or not.

9. A radiation sensitive indicator made from a carrier containing at least the microcapsules according to any one of 1 to 6 above.

10. A radiation sensitive indicator wherein a radiation sensitive layer containing at least the microcapsules according to any one of 1 to 6 above is formed on a carrier.

11. A radiation sensitive indicator wherein a radiation sensitive layer containing at least the microcapsules according to any one of 1 to 6 above, and an ultraviolet light absorption layer and/or a visible light absorption layer is formed on a carrier.

12. A radiation detecting method for detecting radiation on a substrate onto which the radiation sensitive indicator according to 9, 10 or 11 above has been attached.

The present invention was made based on the remarkable new discovery that a radiation sensitive composition made from leuco compounds (a) and organic halogen compounds (b), even though in itself photosensitive and sensitive to any type of irradiation, can be made to be selectively sensitive to ionizing radiation and non-sensitive to ultraviolet light, visible light and other types of irradiations.

The most significant feature of the present invention is that a radiation sensitive composition of a specific composition is enclosed in microcapsules, and that as a result of this microencapsulation said composition becomes selectively sensitive to ionizing radiation and non-sensitive (stabilized) to visible and ultraviolet light etc.

It is presumed that the reason why the present invention exhibits such a selective effect is probably because by enclosing said composition in microcapsules, which are mininute discrete and closed systems, it is stabilized by the effect of these particular systems; however, the precise mechanism thereof is still not understood.

Anyway, this selective effect of the present invention is a novel and special effect, unknown until the present day, which occurs as a result of the microencapsulation.

The present invention, by means of this special feature, provides a material which takes on a color or changes its colors, especially, when selectively sensitized by low radiation doses in the range from 0.001 to 20000 Gy, which is impossible by conventional means. Such a material has tremendous industrial utility.

DETAILED DESCRIPTION OF THE INVENTION

Figure 1:
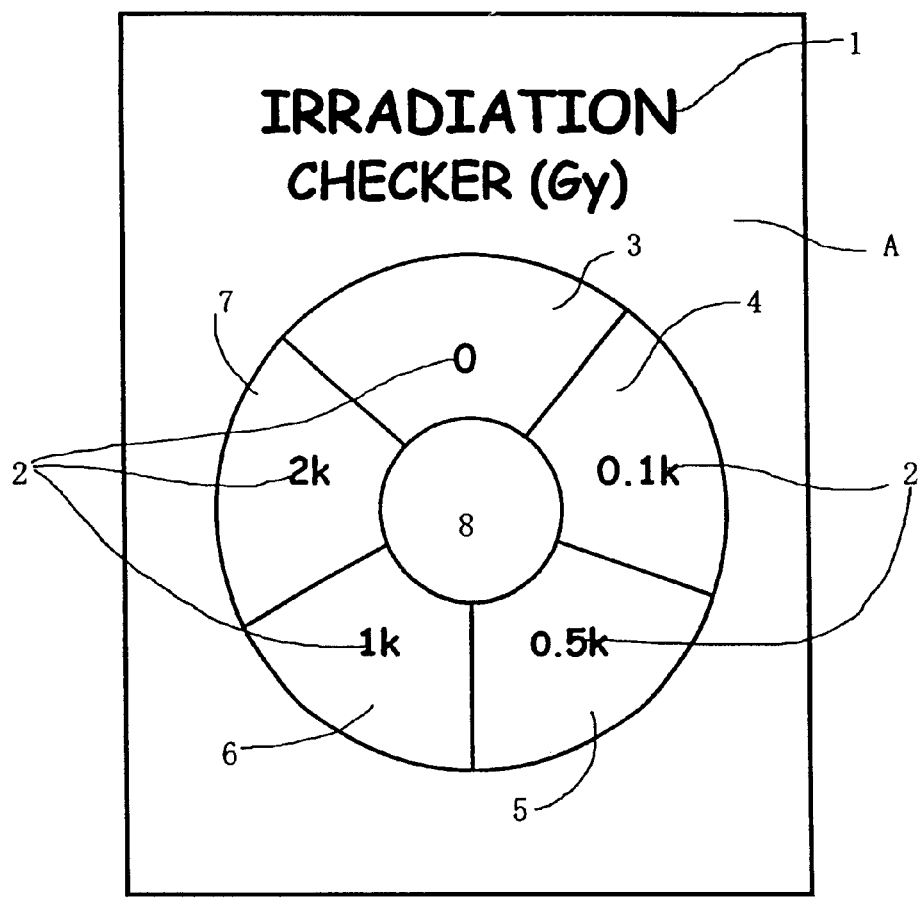
FIG. 1 is a drawing of a radiation sensitive indicator according to the present invention.

Below, the present invention will be described in still greater detail.

The selectively radiation sensitive microcapsules according to the present invention microencapsulate a radiation sensitive composition comprising leuco compounds (a) and organic halogen compounds (b) as indispensably components or a radiation sensitive composition further comprising an organic solvent (c) and/or an antioxidant (d).

The constitutional features etc. of the present invention will be explained in detail below.

(1) Leuco Compounds

All leuco pigments known as conventionally known pigments for pressure or heat sensitive paper together with the different leuco pigments known as precursors for other pigments can be used as leuco compounds without any particular limitation.

As examples of leuco compounds can be given by e.g. triphenylmethane phthalide, fluoran, phenothiazine, phenazine, indolyl phthalide, leuco olamin, spiropyran, Spiro phthalan, spironaphthoxazine, naphthopyran, rhodamine lactam, rhodamine lacton, indoline, diphenylmethane, triphenylmethane, azaphthalide, triazene, chromeno indole, xanthene, diacetylene, naphtholactam and azomethine compounds etc., without, however, limiting the compounds that can be used thereto.

Nevertheless, in the present invention, among the compounds given as examples above, triphenylmethane compounds and their homologues as well as diphenylmethane compounds and their homologues, represented by Compound 5 or Compound 6 below, are particularly preferred.

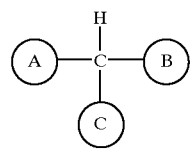

Compound 5

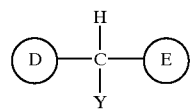

Compound 6 wherein each of the rings A, B, C, D and E represents 5 or 6-membered aromatic or heterocyclic rings which may have a subsituent group, one or more aromatic or heterocyclic rings may be condensed therein, and each of the rings may be cross-linked by O, N or S. Further, Y exists when the central carbon is not conjugated with the D or the E ring, and represents hydrogen, a hydroxy group, an alkoxy group or an aryloxy group.

As examples of substituent groups for the above-mentioned rings A, B, C, D and E can be given by amino, dialkylamino, diarylamino, alkoxy, aryloxy, acyl, acyloxy, alkoxycarbonyl, aryloxycarbonyl, alkyl, aryl, hydroxy and other groups, without however limiting the groups that can be used thereto.

As specific examples of Compounds 5 and 6 above can be given, e.g., the following compounds.

1) tris[4-(dimethylamino)phenyl]methane 2) tris[4-(diethylamino)phenyl]methane 3) tris[4-(dimethylamino)-2-methyl-phenyl]methane 4) bis[4-(dimethylamino)phenyl]phenylmethane 5) bis[4-(dimethylamino)phenyl]4-metoxyphenylmethane 6) bis [4-(diethylamino)phenyl]phenylmethane 7) 9-diethylamino-12-(2-metoxycarbonylphenyl)-benzo (a)xanthene 8) 2,8-dimethylamino-xanthene 9) 4,4'-bis(diethylamino)benzhydrol 10) Compounds represented by Compound 7 below;

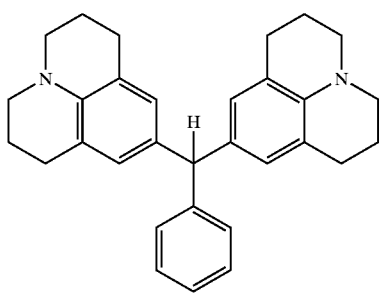

Compound 7

11) Compounds represented by Compound 8 below;

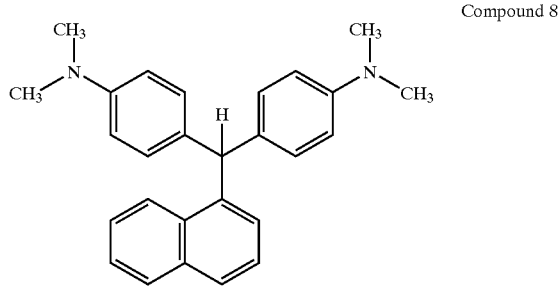

Compound 8

12) Compounds represented by Compound 9 below;

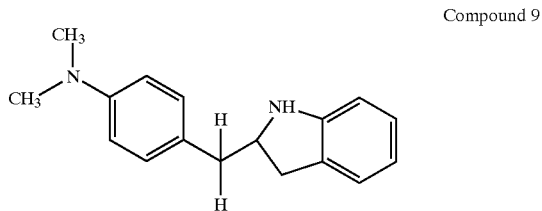

Compound 9

(2) Organic Halogen

In principle, all conventionally known organic halogen compounds, without any particular limitation, can be used; however, organic halogen compounds having a structure in which the halogen radicals are easily stripped are particularly preferred.

As examples of such compounds can be given by carbon tetrachloride; tetrabromomethane; chloroform; bromoform; dichloromethane; dibromomethane; 1,1,2,2-tetrachloroethane; 1,1,2-trichloroethane; 1,2,3-trichloropropane; 1,2,3-tnbromopropane; 1,1,1-trichloroethane; 1,3-dibromobutane; 1,4-dibromobutane; 1,2-dichloroethane; n-octyl chloride; isopropyl bromide; perchlene; trichlene; 1,2,3,4-tetrachlorobenzene; 1,2,4,5-tetrachlorobenzene; 1,2,4-tetrachlorobenzene; o-dichlorobenzene; o-dibromobenzene; p-dichlorobenzene; p-dibromobenzene; monochlorobenzene; monobromobenzene; monoiodobenzene; trichloroacetic acid; α-bromoisobutyric acid ethyl; phenyltrifluoromethane; 1,1,3-trihydrotetrafluoropropanol; 4,4'-dichloro diphenyl-2,2-propan; o-chloroaniline; p-chloroacetophenone; o-chlorobenzoic acid; 3,4-dichlorotoluene; o-chloronitrobenzene; p-chlorobenzotrichloride; benzotrifluoride; 3,3'-dichloro-4,4'-diaminodiphenylmethane; N-bromosucciimide; α,α,α-tribromomethylphenylsulfon; 2',2'-bis(2-chlorophenyl)-4,4',5,5'-tetraphenyl-1,1'-bi-1H-imidazol; etc.; without, however, limiting the compounds that can be used thereto.

The radiation sensitive compositions according to the present invention are basically constituted by the two indispensable components (a) and (b) mentioned above; ordinarily, 0.01 to 100000 wt. parts of component (b) are used for 1 wt. part of component (a); the 2 components are constituted so as to uniformly dissolve; however, depending on the type and dose levels of radiation to be detected, the type and amount of both components (a) and (b) can be freely selected.

(3) Organic Solvent

The organic solvent used exhibits, in addition to the ordinary function (I) of solvents, also the function (II) of controlling and regulating the sensitivity to radiation of the radiation sensitive compositions according to the present invention.

Function (I) of the solvent is used to dissolve components (a) and (b) in cases in which it is difficult to uniformly dissolve both components if e.g. the two components (a) and (b) are both solids or if component (b) is a gas. This function is also used to meet the conditions for microencapsulation if a substance needs to be in the liquid state in order to be microencapsulated.

Further, it is possible to freely change the level of sensitivity to radiation, even when using identical components (a) and (b), because the control function (II) regulates the density of the two components (a) and (b) in the discrete and closed system inside the microcapsules.

As examples of organic solvents exhibiting such functions can be given by alcohol-based solvents, ester-based solvents, ketone-based solvents, ether-based solvents, acid amide-based solvents, aromatic solvents, etc. As concrete examples of such solvents can be given ethanol, butanol, octanol, lauryl alcohol, stearyl alcohol, oleyl alcohol, behenyl alcohol, ethyleneglycol, glycerine, butyl acetate, lauryl laurate, myristyl palnitate, methyl stearate, dioctyl phihalate, diisononyl phthalate, dioctyl adipate, diisodecyl adipate, tricresyl phosphate, acetone, methyl isobutyl ketone, cyclohexanone, distearyl ketone, acetophenone, benzophenone, diethyl ether, distearyl ether, diethyleneglycol monoethylether, cellosolve acetate, tetrahydrofuran, dioxane, stearic acid amide, oleic acid amide, benzene, toluene, xyrene, ethylbenzene, naphthalene, isopropylnaphthalene, etc., without, however, limiting the compounds that can be used thereto. Alcohols, esters and aromatic hydrocarbons are particularly preferred.

In the present invention, it is possible to use each of these organic solvents on its own or to use two or more in combination. Ordinarily it is sufficient to use an amount of about 1 to 100000 wt. parts of the solvent for 1 wt part of component (a).

(4) Antioxidant

The selectively radiation sensitive microcapsules according to the pre sent invention, ricroencapsulate, as mentioned above, a radiation sensitive composition comprising components (a) and (b) as indispensable components or a radiation sensitive composition further comprising component (c), to exhibit a selective sensitivity to ionizing radiation only; however, the sensitivity to ultraviolet and visible light can be reduced even more by further adding an antioxidant to these compositions.

This excellent characteristic brought about by an antioxidant according to the present invention, first discovered as a result of the research undertaken by the inventors of the present invention, is a novel effect conventionally not known as an antioxidant function.

All conventionally known organic halogen compounds, without any particular limitation, can be used.

As examples of antioxidants can be given by, e.g., 2,6-di-tert-butyl-p-cresol; 2,2'-methylene-bis-(4-methyl-6-tert-butylphenol); 4,4'-thiobis-(3-methyl-6-tert-butylphenol); 3,9-bis[1,1-dimethyl-2-[β-(3-tert-butyl-4-hydroxy-5-methylphenol)propionyloxy]ethyl]2,4,8,10-tetraoxaspiro[5,5]undecan; 1,1,3-tris-(2-methyl-4-hydroxy-5-tert-butylphenyl)butan; tetrakis-[methylene-3-(3',5'-di-tert-butyl-4'-hydroxyphenyl)propionate]methane; tocopherols; tocotrienols; dilaurylthiodipropionate; triphenylphosphite; tris(nonylphenyl)phosphite; diisodecylpentaerythritoldiphosphite; 10-decyloxy-9,10-dihydro-9-oxa-10-phosphaphenanthrene; cyclic neopentanetetraylbis(2,4-di-tert-butylphenyl)phosphite; 2,2-methylenebis(4,6di-tert-butylphenyl)octylphosphite; etc., without, however, limiting the antioxidants that can be used thereto.

These antioxidants can be used at an amount of 0.0001 to 100 wt parts for 1 wt part of component (a).

(5) Microcapsules

According to the present invention, basically any conventionally known type of microcapsule capable of enclosing the above-mentioned radiation sensitive composition inside a minute discrete and closed system, any conventionally known method of microencapsulation and any conventionally known substance for forming the microcapsule walls can be used without any limitation whatsoever.

As a method of microencapsulation can be given by e.g. coacervation, interfacial polymerization, in-situ polymerization, liquid-bed coating, air-suspension coating, spray drying, etc., without, however, limiting the method that can be used thereto.

According to the present invention, each of these methods can be used on its own or 2 or more can be used in combination with one another to obtain single- or multiple-walled microcapsules with an average diameter in the range of 0.1 to 500 $\mu$m enclosing the composition according to the present invention.

Further, in the present invention, the terms "enclosing" and "microcapsule wall" are used for the sake of convenience; however, the structure of the microcapsules according to the present invention is not limited to a structure wherein a composition is enclosed within microcapsule walls, but structures of solid solutions wherein the resin is completely united with a composition, mentioned hereinafter, are also included.

As preferred examples of substances for forming the microcapsule walls in the above-mentioned methods can be given by a polyamine and a carbonyl compound for forming a polyurea shell a polybasic acid chloride and a polyamine for forming a polyamide shell, a polyisocyanate and a polyhydroxy compound for forming a polyurethane shell, a polybasic acid chloride and a polyhydroxy compound for forming a polyester shell, an epoxy compound and a polyamine for forming an epoxy resin shell, a melamine-formaldehyde prepolymer for forming a melamine resin shell and a urea-formaldehyde prepolymer for forming a urea resin shell, as well as gelatin, ethylcellulose, polyvinyl alcohol carboxymethyl cellulose, polystyrene, polyvinyl acetate etc.

Further, the microcapsules according to the present invention, apart from the above-mentioned components, can also contain, if desired, ultraviolet light absorbing agents, paints, pigments and other known additives.

(6) Detection Mechanism

The type of radiation detected according to the present invention is not particularly limited, a wide range of rays, starting with $\alpha$-, $\beta$-, $\gamma$- and X-rays and other electron and particle beams emitted during nuclear reaction or fission etc., can be detected.

The microcapsules according to the present invention, which, as described above, have the momentous effect of taking on a color or changing their colors only when selectively sensitized by ionizing radiation while being non-sensitive to ultraviolet light, visible light and other types of irradiations, have the properties listed below.

1. The microcapsules according to the present invention, before being exposed to radiation, are ordinarily colorless or lightly colored, but when exposed to radiation, they take on an intense color. It is therefore easy to ascertain radiation exposure, i.e. to detect radiation, by observing this phenomenon of coloring or change of color.

2. This phenomenon of coloring or change of colors is irreversible. Hence, the history of radiation exposure does not become unclear, even if this phenomenon is not observed in detail during the entire process.

3. The coloring or change of colors according to the present invention occurs with extremely low levels of radiation dose, in the range from 0.001 to 20000 Gy. Therefore, it is also possible to selectively detect low doses of radiation, conventionally considered impossible by means of this type of simple method.

4. The intensity of the above-mentioned phenomenon of coloring or change of colors can be made to change proportional to the dose levels of radiation. Hence, apart from detecting the presence of radiation, the dose levels can also be detected by ascertaining the intensity of coloring or the degree of color change.

(7) Method of Use

Regarding the methods of use of the present invention, the examples explained below can be given; however, the scope of the present invention is not limited thereto.

1. Ink and Paint

The microcapsules according to the present invention can be contained in ordinary ink or paint. And when printing or coating this ink or paint onto different substrates, it can very easily be detected whether or not these substrates are exposed to radiation.

2. Radiation Indicator

The microcapsules according to the present invention can be used in a radiation indicator wherein a radiation sensitive layer containing the microcapsules is formed on a carrier.

Further, such an indicator can also be constituted by a carrier into which the incrocapsules according to the present invention have been introduced.

a. Carrier

As examples of carrier used for the indicator can be given e.g., sheets of different types of paper, plastic film, woven and non-woven textiles, metal foil, etc.; without limiting the carrier that can be used thereto.

b. Method for Forming the Radiation Sensitive Layer

Different methods can be given for forming the radiation sensitive layer provided on the carrier, without limiting the methods that can be used thereto. E.g., the layer can be formed by printing or coating the ink or paint mentioned under 1. above; however, there is nothing to prevent the use of any other method.

Further, it is possible to provide the above-mentioned radiation sensitive layer on the entire carrier or any part thereof by any of the above-mentioned methods; however, this type of design feature can be selected at will by a person skilled in the art and in no way limits the scope of the invention.

Hence, there is nothing to prevent the use of a general ink or paint, not sensitive to radiation, to provide different types of displays on the above-mentioned carrier. A foundation masking layer can further be provided below the radiation sensitive layer if it is difficult to recognize the coloring or change of color in cases in which the foundation has an intense color.

c. Other Features

If desired, it is also possible to provide an ultraviolet light absorbing layer and/or a visible light absorbing layer on the radiation sensitive layer.

It is possible to form the absorbing layers mentioned above by using a conventional ultraviolet light absorbing agent or an ink or paint containing general color pigments capable of absorbing visible light; however, the layers can also be formed by laminating films which contain these products or onto which these products have been coated, i.e. ultraviolet light absorbing films or different colored films.

Further, it is also possible to constitute this type of radiation indicator by coating a protection layer on its surface in order to effectively protect the different layers from various external factors.

3. Utilization

The microcapsules according to the present invention can be used with great ease as means for exposure management in, e.g., nuclear power stations and medical or research facilities in which radioactive substances are handled and radiation occurs. Moreover, they can also be used as means for easily detecting exposure doses of radiation in facilities in which radiation is used for sterilization or different manufacturing processes.

As examples of this type of application can be given, e.g., the use as means for ascertaining whether or not blood transfusion products or agricultural products such as meat, cereals, fruit, etc. have been subject to radiation sterilization treatment.

BEST MODE FOR CARRYING OUT THE INVENTION

Below, the invention will be explained in still greater detail with the help of the Examples; however, the present invention is not limited thereto.

Further, in the text hereinafter, unless otherwise specified, the expressions "part" and mean "wt. part" and "wt. %", respectively.

Methods of Producing the Microcapsules

[Production Example A]

25 parts of the radiation sensitive compositions in Table 3 were weighed and uniformly blended with 5 parts of an epoxy resin (Epikote 828, manufactured by Yuka Shell Epoxy Co., Litd.) while applying heat. The resulting mixture was added to 200 parts of a 10% aqueous solution of gelatin, which had been heated to 70° C., while stirring, whereupon oily droplets of about 10 μm diameter were obtained by emulsification.

Then, while continuing to stir, 4 parts of an epoxy resin curing agent (Epicure U, manufactured by Yuka Shell Epoxy Co., Ltd.) were added. The resulted mixture was heated to 90° C. and made to react at this temperature for 4 hours.

Thereafter, the microcapsules according to the present invention containing a radiation sensitive composition were obtained by cooling the liquid to a temperature in the vicinity of room temperature, washing the granulate with water and leaving it to dry after separation by filtering.

[Production Example B]

10 parts of the radiation sensitive compositions in Table 3 were added to 50 parts of a 10% aqueous solution of gelatin, which had been heated to 40° C., while stirring, and oily droplets of about 20 μm diameter were obtained by emulsification Thereafter, the dispersion liquid was added to 100 parts of a 5% aqueous solution of gum arabic, which had been heated to 40° C., while stirring, and a 10% aqueous solution of acetic acid was added by dripping while continuing to stir to adjust the pH to 4.

And after about 100 parts of warm water, which had been heated to 40° C., had been slowly added, 2 parts of formalin was added.

And after stirring for 40 minutes while maintaining the liquid temperature at 40° C., the temperature was lowered to not more than 5° C., at which temperature the stirring was continued for 1 hour more.

And after adding a 10% aqueous solution of caustic soda by dripping to adjust the pH to 9, the liquid temperature was raised to 50° C. by increasing the temperature at a rate of 1° C. per minute.

And after leaving this dispersion liquid overnight, extracting a granulate by decantation and washing it with water, the microcapsules according to the present invention containing a radiation sensitive composition were obtained by drying the filtrate.

[Production Example C]

10 parts of the radiation sensitive compositions in Table 3 were added to 100 parts of a 1% aqueous solution of polyacrylate soda, which had been heated to 80° C. while stirring, and oily droplets of about 5 μm diameter were obtained by emulsification.

Next, 5 parts of a melamine formalin prepolymer were added to the dispersion liquid and dilute hydrochloric acid was added by dripping, while continuing to stir, to adjust the pH of the system to 4.5; after which the stirring was continued for 2 hours at the temperature of 80° C.

Thereafter, the microcapsules made from melamine resin, having a polyacrylate soda layer at their surface and containing a radiation sensitive composition were obtained by spray drying the dispersion liquid in a spray dryer.

EXAMPLES 1–64

The Examples of the present invention are listed in Tables 1 and 2.

In Tables 1 and 2, the "Nos" given in the column for the "radiation sensitive compositions" are the "Nos" of the radiation sensitive compositions listed in Table 3, and the alphabetic letters given in the column for the "microcapsules" correspond to the alphabetic letters of the microcapsule Production Examples described above. E.g., the microcapsules in Example 1 are prepared according to Production Example A with radiation sensitive composition No. 1 of Table 3.

Further, in the column for the "mode of coloring or color change", the color change occurring as a result of irradiation with 1000 Gy of γ rays is given. E.g., the microcapsules in Example 1, which were "colorless" before exposure to γ rays, changed to "blue" after irradiation with γ rays.

Moreover, the radiation sensitive compositions given in Table 3 are constituted by mixing the different components in the proportion of the number of parts given so that they are uniformly dissolved. Components which do not easily form a uniform mixture at room temperature are dissolved by heating if needed.

Further, the abbreviations given in Table 3 have the following meaning.

$a_1$ . . . tris[4-(dimethylamino)phenyl]methane (also called leuco crystal violet)
$a_2$ . . . 9-diethylamino-12-(2-methoxycarbonylphenyl)-benzo(a)xanthene
$a_3$ . . . bis[4-(diethylamino)phenyl]phenylmethane
$a_4$ . . . 4,4'-bis(diethylamino)benzohydrole
$a_5$ . . . 4,4'-bis(diethylamino)benzophenone
$a_6$ . . . 6-(dimethylamino)-3,3-bis[4-(dimethylamino)phenyl]-1(3H)-isobenzofuranone
$a_7$ . . . 2-(2-chloroaniline)-7-dibutylamino-10-(2-methoxycarbonylphenyl)-xanthene
$a_8$ . . . 3,7-dimethoxy-10-(2-ethoxycarbonylphenyl)-xanthene
$d_1$ . . . 2,2'-methylene-bis-(4methyl-6-tert-butylphenol)
$d_2$ . . . δ-tokopherole
$d_3$ . . . dilaurylthiodipropionate

EXAMPLE 65

A water-based paint made from 30 parts of the microcapsules of Example 1, 40 parts of an emulsion of ethylenevinyl acetate copolymer resins (with 40% of solid parts), 1 part of a silicon-based antifoarning agent, 1 part of an epoxy-based cross-linking agent and 28 parts of water was used to form a radiation sensitive layer in the form of letters by spray coating the word "DANGER" on a white board.

There was no change in color even after placing the board outdoors for 1 day; however, the word "DANGER" was clearly formed in green letters on the white board when irradiating the board with 500 Gy of $^{60}$Co-γ rays. As a result it was understood that it is possible to detect irradiation with γ rays by means of the microcapsules of the Example.

COMPARATIVE EXAMPLE

A water-based paint was prepared in the same way as above, except that the 30 parts of the microcapsules of Example 1 were replaced with 30 parts of the composition before microencapsulation (i.e., Composition No. 1 in Table 3), and was used in the same way as above to form the word "DANGER" on a white board.

When this board was placed outdoors in the same way as in the above Example, due to the influence of the ultraviolet rays, etc., comprised in the sun light, the word "DANGER" was formed in green letters even before irradiation with γ rays; and even when irradiating the board with 500 Gy of $^{60}$Co-γ rays as soon as possible, there was almost no change of the tone in the green color. Thus, as a result it was understood that it is not possible to detect y rays by means of the paint used in the Comparative Example.

When comparing Example 65 with the above Comparative Example, it is clear that selective sensitivity towards ionizing radiation is conferred by the microencapsulation means according to the present invention.

EXAMPLE 66

A radiation sensitive indicator according to the present invention was prepared as shown in FIG. 1.

On the biaxially oriented polyester (PET) film A shown in the Figure, the letters indicated by 1 were formed by printing with ordinary green ink, those indicated by 2 were formed by printing with ordinary black ink, the area indicated by 3 was left white, the areas indicated by 4 to 7 were colored with green ink so as to gradually increase the intensity of the color, and the area indicated by 8 was coated with an ink containing the microcapsules of Example 55. Further, an ultraviolet light absorbing film, not shown in the Figure, is laminated so as to cover the whole area of the indicator and an adhesive layer, also not shown in the Figure, is provided at the back of the indicator.

On the radiation sensitive indicator according to the present invention which has the constitution described above, the radiation sensitive area 8 is designed so that the intensity of the green coloring varies according to the dose level of radiation (i.e., the higher the dose level, the stronger the intensity of the green color), and since areas 4 to 7 are colored so as to correspond to the different intensities of the green colorings of area 8, which correspond to the different dose levels, it is easy to detect the irradiated dose level of radiation by comparing the intensity of the coloring of area 8 with the colors of areas 4 to 7 (In the case of FIG. 1, area 8 takes on a green color when sensitized by dose levels of radiation in the range of about 0.1 kGy (=100 Gy) to 2 kGy (=2000 Gy)).

It is extremely easy to tell whether or not a required radiation sterilization has been carried out with the required dose level by attaching this indicator with the adhesive layer to blood transfusion packs, medical supplies, meat packs sold at stores, cereals, fruits, etc.

TABLE 1

| Example | Radiation Sensitive Composition | Microcapsule | Mode of Coloring or Color Change |
|---|---|---|---|
| 1 | No. 1 | A | Colorless → Blue |
| 2 | No. 1 | B | Colorless → Blue |
| 3 | No. 1 | C | Colorless → Blue |
| 4 | No. 2 | A | Colorless → Blue |
| 5 | No. 2 | B | Colorless → Blue |
| 6 | No. 2 | C | Colorless → Blue |
| 7 | No. 3 | A | Colorless → Blue |
| 8 | No. 3 | B | Colorless → Blue |
| 9 | No. 3 | C | Colorless → Blue |
| 10 | No. 4 | A | Colorless → Blue |
| 11 | No. 4 | B | Colorless → Blue |
| 12 | No. 4 | C | Colorless → Blue |
| 13 | No. 5 | A | Colorless → Blue |
| 14 | No. 5 | B | Colorless → Blue |
| 15 | No. 5 | C | Colorless → Blue |
| 16 | No. 6 | A | Colorless → Blue |
| 17 | No. 7 | C | Colorless → Blue |
| 18 | No. 8 | B | Colorless → Blue |
| 19 | No. 9 | C | Colorless → Blue |
| 20 | No. 10 | B | Colorless → Blue |
| 21 | No. 11 | A | Colorless → Red |
| 22 | No. 11 | B | Colorless → Red |
| 23 | No. 11 | C | Colorless → Red |
| 24 | No. 12 | C | Colorless → Red |
| 25 | No. 13 | C | Colorless → Red |
| 26 | No. 14 | A | Colorless → Red |
| 27 | No. 14 | B | Colorless → Red |
| 28 | No. 15 | A | Colorless → Green |
| 29 | No. 15 | B | Colorless → Green |
| 30 | No. 15 | C | Colorless → Green |
| 31 | No. 16 | B | Colorless → Green |
| 32 | No. 17 | C | Colorless → Green |

TABLE 2

| Example | Radiation Sensitive Composition | Microcapsule | Mode of Coloring or Color Change |
|---|---|---|---|
| 33 | No. 18 | A | Colorless → Blue |
| 34 | No. 18 | B | Colorless → Blue |
| 35 | No. 18 | C | Colorless → Blue |
| 36 | No. 19 | B | Colorless → Blue |
| 37 | No. 20 | A | Light Yellow → Bluish Green |
| 38 | No. 20 | B | Light Yellow → Bluish Green |
| 39 | No. 20 | C | Light Yellow → Bluish Green |
| 40 | No. 21 | C | Light Yellow → Bluish Green |
| 41 | No. 22 | A | Colorless → Blue |
| 42 | No. 22 | B | Colorless → Blue |
| 43 | No. 22 | C | Colorless → Blue |
| 44 | No. 23 | C | Colorless → Blue |
| 45 | No. 24 | C | Colorless → Purple |
| 46 | No. 25 | A | Colorless → Blue |
| 47 | No. 26 | A | Colorless → Blue |
| 48 | No. 26 | B | Colorless → Blue |
| 49 | No. 26 | C | Colorless → Blue |
| 50 | No. 27 | A | Colorless → Blue |
| 51 | No. 27 | B | Colorless → Blue |
| 52 | No. 27 | C | Colorless → Blue |
| 53 | No. 28 | A | Colorless → Blue |
| 54 | No. 29 | B | Colorless → Blue |
| 55 | No. 30 | C | Colorless → Blue |
| 56 | No. 31 | A | Colorless → Blue |
| 57 | No. 32 | A | Colorless → Blue |
| 58 | No. 32 | B | Colorless → Blue |
| 59 | No. 32 | C | Colorless → Blue |
| 60 | No. 33 | B | Colorless → Red |
| 61 | No. 34 | B | Colorless → Green |
| 62 | No. 35 | C | Colorless → Blue |
| 63 | No. 36 | A | Colorless → Black |
| 64 | No. 37 | A | Colorless → Yellow |

TABLE 3

| No. | (a) Leuco Compound | (b) Organic Halogen Compound | (c) Organic Solvent | (d) Antioxidant |
|---|---|---|---|---|
| 1 | $a_1$ (1 part) | Monobromobenzene (100 parts) | — | — |
| 2 | $a_1$ (1 part) | o-dichlorbenzene (300 parts) | — | — |
| 3 | $a_1$ (1 part) | Bromoform (1000 parts) | — | — |
| 4 | $a_1$ (1 part) | Carbon tetrachloride (1000 parts) | — | — |
| 5 | $a_1$ (1 part) | 1,1,2-trichloroethane (500 parts) | — | — |
| 6 | $a_1$ (1 part) | carbon tetrabromide (50 parts) o-dibromobenzene (500 parts) | — | — |
| 7 | $a_1$ (1 part) | 1,2,3,4-tetrachlorobenzene (50 parts) | 1-octanol (1000 parts) | — |
| 8 | $a_1$ (1 part) | 1,2,3,4-tetrachlorobenzene (50 parts) | Xylene (1000 parts) | — |
| 9 | $a_1$ (1 part) | α,α,α-tribromomethylphenylsulfone (50 parts) | Dioctyladipate (2000 parts) | — |
| 10 | $a_1$ (1 part) | α,α,α-tribromomethylphenylsulfone (50 parts) | Toulene (2000 parts) | — |
| 11 | $a_2$ (1 part) | Monobromobenzene (100 parts) | — | — |
| 12 | $a_2$ (1 part) | Trichlene (200 parts) | — | — |
| 13 | $a_2$ (1 part) | 1,2,3,4-tetrachlorobenzene (50 parts) Monochlorobenzene (1000 parts) | — | — |
| 14 | $a_2$ (1 part) | α,α,α-tribromomethylphenylsulfone (50 parts) | 1-octanol (500 parts) Xylene (1000 parts) | — |
| 15 | $a_3$ (1 part) | Monobromobenzene (100 parts) | — | — |
| 16 | $a_3$ (1 part) | Chloroform (200 parts) 1,2,3-trichloropropane (200 parts) | — | — |
| 17 | $a_3$ (1 part) | Carbon tetrachloride (50 parts) | Xylene (1000 parts) | — |
| 18 | $a_4$ (1 part) | Monobromobenzene (100 parts) | — | — |
| 19 | $a_4$ (1 part) | Bromoform (500 parts) | — | — |
| 20 | $a_3$ (1 part) | Monobromobenzene (100 parts) | — | — |
| 21 | $a_3$ (1 part) | 1,3-dibromobutane (500 parts) | — | — |
| 22 | $a_6$ (1 part) | Monobromobenzene (100 parts) | — | — |
| 23 | $a_6$ (1 part) | α,α,α-tribromomethylphenylsulfone (50 parts) | 1-octanol (1000 parts) | — |
| 24 | $a_1$ (0.5 parts) $a_2$ (0.5 parts) | Monobromobenzene (100 parts) | — | — |
| 25 | $a_1$ (1 part) | Monobromobenzene (100 parts) | Xylene (100 parts) | — |
| 26 | $a_1$ (1 part) | Monobromobenzene (100 parts) | — | $d_1$ (0.5 parts) |
| 27 | $a_1$ (1 part) | Monobromobenzene (100 parts) | Xylene (100 parts) | $d_1$ (0.5 parts) |
| 28 | $a_1$ (1 part) | Monobromobenzene (100 parts) | — | $d_1$ (1 part) |
| 29 | $a_1$ (1 part) | Monobromobenzene (100 parts) | — | $d_1$ (10 parts) |
| 30 | $a_1$ (1 part) | Monobromobenzene (100 parts) | — | $d_2$ (0.5 parts) |
| 31 | $a_1$ (1 part) | Monobromobenzene (100 parts) | — | $d_3$ (0.5 parts) |
| 32 | $a_1$ (1 part) | α,α,α-tribromomethylphenylsulfone (50 parts) | Toulene (2000 parts) | $d_2$ (5 parts) |
| 33 | $a_2$ (1 part) | 1,2,3,4-tetradilorobenzene (50 parts) Monochlorobenzene (1000 parts) | — | $d_2$ (1 part) |
| 34 | $a_3$ (1 part) | Carbon tetrachloride (50 parts) | Xylene (1000 parts) | $d_2$ (1 part) |
| 35 | $a_6$ (1 part) | Monobromobenzene (100 parts) | — | $d_3$ (1 part) |
| 36 | $a_7$ (1 part) | Monobromobenzene (100 parts) | — | — |
| 37 | $a_8$ (1 part) | Monobromobenzene (100 parts) | — | — |

Effect of the Invention (1) The microcapsules according to the present invention have an momentous effect of taking on a color or changing their colors only when selectively sensitized by ionizing invention while being non-sensitive to ultraviolet light, visible light and other types of irradiations.

(2) The phenomenon of coloring o r change of colors according to the present invevntion is irreversible. Hence, the history of radiation exposure does not become unclear, evenif this phenomenon is not observed in detail during the entire process.

(3) The phenomenon of coloring or change of colors occurs with extremely low levels of radiation doses in the range from 0.001 to 20000 Gy. Therefore, it is also possible to sectively detect low doses of radiation, conventionally considered impossible by means of this type of simple method, which represents a great advantage in terms of industrial utility.

(4) The intensity of the above-mentioned phenomenon of coloring or change of color can be made to change proportional to the dose levels of radiation. Hence, apart from detecting the presence of radiation, there is also the utility that the dose levels can be detected by ascertaining the intensity of coloring or the degree of color change.

We claim:

1. Microcapsules containing a radiation sensitive composition comprising leuco compounds (a) and organic halogen compounds (b) as indispensable components.

2. Microcapsules containing a radiation sensitive composition comprising leuco compounds (a) and halogen compounds (b) as indispensable components, and further an organic solvent (c) and/or an antioxidant (d).

3. Microcapsules according to claim 1 wherein the leuco compounds (a) are at least one member selected from the group consisting of triphenylmethane phthalides, fluorans, phenothiazines, phenazines, indolyl phthalides, leuco olamins, spiropyrans, spiro phthalans, spironaphthoxazines, naphthopyrans, rhodamine lactams, rhodamine lactons, indolines, diphenylmethanes, triphenylmethanes, azaphthalides, trizenes, chromeno indoles, xanthenes, diacetylenes, naphtholactams and azomethines.

4. Microcapsules according to claim 2 wherein the leuco compounds (a) are at least one member selected from the group consisting of triphenylmethane phthalides, fluorans, phenothiazines, phenazines, indolyl phthalides, leuco olamins, spiropyrans, spiro phthalans, spironaphthoxazines, naphthopyrans, rhodamine lactams, rhodamine lactons, indolines, diphenylmethanes, triphenylmethanes, azaphthalides, trizenes, chromeno indoles, xanthenes, diacetylenes, naphtholactams and azomethines. Microcapsules according to claim 1 wherein the leuco compounds (a) are at least one member selected from the group consisting of Compounds 1 and 2 below;

Compound 1

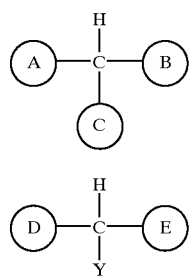

Compound 2

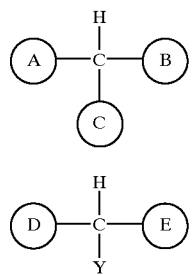

wherein, each of the rings A,B,C,D,E represents 5 or 6 membered aromatic or heterocyclic rings which may have a substituent group, one or more aromatic or heterocyclic rings may be condensed, and each of the rings may be cross-linked by O, N, or S, further, Y exists when the central carbon is not conjugated with the D or the E ring, and represents hydrogen, a hydroxy group, an alkoxy group or an aryloxy group.

5. Microcapsules according to claim 2 wherein the leuco compounds (a) are at least one member selected from the group consisting of Compounds 1 and 2 below;

Compound 1

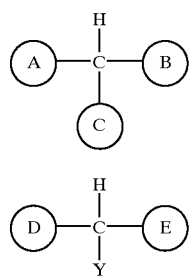

Compound 2

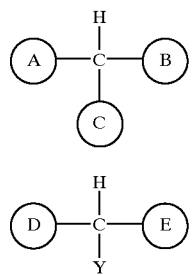

wherein, each of the rings A,B,C,D,E represents 5 or 6 membered aromatic or heterocyclic rings which may have a substituent group, one or more aromatic or heterocyclic rings may be condensed, and each of the rings may be cross-linked by O, N, or S, further, Y exists when the central carbon is not conjugated with the D or the E ring, and represents hydrogen, a hydroxy group, an alkoxy group or an aryloxy group.

6. Microcapsules according to claim 3 wherein the leuco compounds (a) are at least one member selected from the group consisting of Compounds 1 and 2 below;

Compound 1

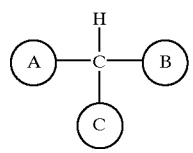

-continued

Compound 2

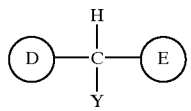

wherein, each of the rings A,B,C,D,E represents 5 or 6 membered aromatic or heterocyclic rings which may have a substituent group, one or more aromatic or heterocyclic rings may be condensed, and each of the rings may be cross-linked by O, N, or S, further, Y exists when the central carbon is not conjugated with the D or the E ring, and represents hydrogen, a hydroxy group, an alkoxy group or an aryloxy group.

7. Microcapsules according to claim 1 wherein the organic solvent (c) is at least one member selected from the group consisting of alcohols, esters and aromatic hydrocarbons.

8. Microcapsules according to claim 2 wherein the organic solvent (c) is at least one member selected from the group consisting of alcohols, esters and aromatic hydrocarbon.

9. Microcapsules according to claim 3 wherein the organic solvent (c) is at least one member selected from the group consisting of alcohols, esters and aromatic hydrocarbons.

10. Microcapsules according to claim 4 wherein the organic solvent (c) is at least one member selected from the group consisting of alcohols, esters and aromatic hydrocarbons.

11. Microcapsules according to claim 1 wherein the microcapsules take on a color or change their colors when sensitized by dose levels of radiation in the range from 0.001 to 20 000 Gy.

12. Microcapsules according to claim 2 wherein the microcapsules take on a color or change their colors when sensitized by dose levels of radiation in the range from 0.001 to 20 000 Gy.

13. Microcapsules according to claim 3 wherein the microcapsules take on a color or change their colors when sensitized by dose levels of radiation in the range from 0.001 to 20 000 Gy.

14. Microcapsules according to claim 4 wherein the microcapsules take on a color or change their colors when sensitized by dose levels of radiation in the range from 0.001 to 20 000 Gy.

15. Microcapsules according to claim 5 wherein the microcapsules take on a color or change their colors when sensitized by dose levels of radiation in the range from 0.001 to 20 000 Gy.

16. Microcapsules according to claim 6 wherein the microcapsules take on a color or change their colors when sensitized by dose levels of radiation in the range from 0.001 to 20 000 Gy.

17. Microcapsules according to claim 7 wherein the microcapsules take on a color or change their colors when sensitized by dose levels of radiation in the range from 0.001 to 20 000 Gy.

18. Microcapsules according to claim 8 wherein the microcapsules take on a color or change their colors when sensitized by dose levels of radiation in the range from 0.001 to 20 000 Gy.

19. Microcapsules according to claim 9 wherein the microcapsules take on a color or change their colors when sensitized by dose levels of radiation in the range from 0.001 to 20 000 Gy.

20. Microcapsules according to claim 10 wherein the microcapsules take on a color or change their colors when sensitized by dose levels of radiation in the range from 0.001 to 20 000 Gy.

21. Microcapsules according to claim 11 wherein the microcapsules take on a color or change their colors when sensitized by dose levels of radiation in the range from 0.001 to 20 000 Gy.

22. Microcapsules according to claim 13 wherein the microcapsules take on a color or change their colors when sensitized by dose levels of radiation in the range from 0.001 to 20 000 Gy.

23. Microcapsules according to claim 14 wherein the microcapsules take on a color or change their colors when sensitized by dose levels of radiation in the range from 0.001 to 20 000 Gy.

24. Microcapsules according to claim 15 wherein the microcapsules take on a color or change their colors when sensitized by dose levels of radiation in the range from 0.001 to 20 000 Gy.

25. Microcapsules according to claim 16 wherein the microcapsules take on a color or change their colors when sensitized by dose levels of radiation in the range from 0.001 to 20 000 Gy.

26. Microcapsules according to claim 17 wherein the microcapsules take on a color or change their colors when sensitized by dose levels of radiation in the range from 0.001 to 20 000 Gy.

27. Microcapsules according to claim 18 wherein the microcapsules take on a color or change their colors when sensitized by dose levels of radiation in the range from 0.001 to 20 000 Gy.

28. Microcapsules according to claim 19 wherein the microcapsules take on a color or change their colors when sensitized by dose levels of radiation in the range from 0.001 to 20 000 Gy.

29. Microcapsules according to claim 20 wherein the microcapsules take on a color or change their colors when sensitized by dose levels of radiation in the range from 0.001 to 20 000 Gy.

30. Microcapsules according to claim 21 wherein the microcapsules take on a color or change their colors when sensitized by dose levels of radiation in the range from 0.001 to 20 000 Gy.

31. Microcapsules according to claim 22 wherein the microcapsules take on a color or change their colors when sensitized by dose levels of radiation in the range from 0.001 to 20 000 Gy.

32. Radiation sensitive ink or paint containing the microcapsules according to claim 1.

33. Radiation sensitive ink or paint containing the microcapsules according to claim 2.

34. Radiation sensitive ink or paint containing the microcapsules according to claim 3.

35. Radiation sensitive ink or paint containing the microcapsules according to claim 4.

36. Radiation sensitive ink or paint containing the microcapsules according to claim 5.

37. Radiation sensitive ink or paint containing the microcapsules according to claim 6.

38. Radiation sensitive ink or paint containing the microcapsules according to claim 7.

39. Radiation sensitive ink or paint containing the microcapsules according to claim 8.

40. Radiation sensitive ink or paint containing the microcapsules according to claim 9.

41. Radiation sensitive ink or paint containing the microcapsules according to claim 10.

42. Radiation sensitive ink or paint containing the microcapsules according to claim 11.

43. Radiation sensitive ink or paint containing the microcapsules according to claim 12.

44. Radiation sensitive ink or paint containing the microcapsules according to claim 13.

45. Radiation sensitive ink or paint containing the microcapsules according to claim 14.

46. Radiation sensitive ink or paint containing the microcapsules according to claim 15.

47. Radiation sensitive ink or paint containing the microcapsules according to claim 16.

48. Radiation sensitive ink or paint containing the microcapsules according to claim 17.

49. Radiation sensitive ink or paint containing the microcapsules according to claim 18.

50. Radiation sensitive ink or paint containing the microcapsules according to claim 19.

51. Radiation sensitive ink or paint containing the microcapsules according to claim 20.

52. Radiation sensitive ink or paint containing the microcapsules according to claim 21.

53. Radiation sensitive ink or paint containing the microcapsules according to claim 22.

54. Radiation detecting method for detecting whether a substrate onto which the ink or paint according to any of claims 1–44 in the alternative, has been printed or painted is exposed to radiation or not.

55. A radiation sensitive indicator made from a carrier containing at least the microcapsules according to claim 1.

56. A radiation sensitive indicator made from a carrier containing at least the microcapsules according to claim 2.

57. A radiation sensitive indicator made from a carrier containing at least the microcapsules according to claim 3.

58. A radiation sensitive indicator made from a carrier containing at least the microcapsules according to claim 4.

59. A radiation sensitive indicator made from a carrier containing at least the microcapsules according to claim 5.

60. A radiation sensitive indicator made from a carrier containing at least the microcapsules according to claim 6.

61. A radiation sensitive indicator made from a carrier containing at least the microcapsules according to claim 7.

62. A radiation sensitive indicator made from a carrier containing at least the microcapsules according to claim 8.

63. A radiation sensitive indicator made from a carrier containing at least the microcapsules according to claim 9.

64. A radiation sensitive indicator made from a carrier containing at least the microcapsules according to claim 10.

65. A radiation sensitive indicator made from a carrier containing at least the microcapsules according to claim 11.

66. A radiation sensitive indicator made from a carrier containing at least the microcapsules according to claim 12.

67. A radiation sensitive indicator made from a carrier containing at least the microcapsules according to claim 13.

68. A radiation sensitive indicator made from a carrier containing at least the microcapsules according to claim 14.

69. A radiation sensitive indicator made from a carrier containing at least the microcapsules according to claim 15.

70. A radiation sensitive indicator made from a carrier containing at least the microcapsules according to claim 16.

71. A radiation sensitive indicator made from a carrier containing at least the microcapsules according to claim 17.

72. A radiation sensitive indicator made from a carrier containing at least the microcapsules according to claim 18.

73. A radiation sensitive indicator made from a carrier containing at least the microcapsules according to claim 19.

74. A radiation sensitive indicator made from a carrier containing at least the microcapsules according to claim 20.

75. A radiation sensitive indicator made from a carrier containing at least the microcapsules according to claim 21.

76. A radiation sensitive indicator made from a carrier containing at least the microcapsules according to claim 22.

77. A radiation sensitive indicator wherein a radiation sensitive layer containing at least the microcapsules according to claim 1 is formed on a carrier.

78. A radiation sensitive indicator wherein a radiation sensitive layer containing at least the microcapsules according to claim 2 is formed on a carrier.

79. A radiation sensitive indicator wherein a radiation sensitive layer containing at least the microcapsules according to claim 3 is formed on a carrier.

80. A radiation sensitive indicator wherein a radiation sensitive layer containing at least the microcapsules according to claim 4 is formed on a carrier.

81. A radiation sensitive indicator wherein a radiation sensitive layer containing at least the microcapsules according to claim 5 is formed on a carrier.

82. A radiation sensitive indicator wherein a radiation sensitive layer containing at least the microcapsules according to claim 6 is formed on a carrier.

83. A radiation sensitive indicator wherein a radiation sensitive layer containing at least the microcapsules according to claim 7 is formed on a carrier.

84. A radiation sensitive indicator wherein a radiation sensitive layer containing at least the microcapsules according to claim 8 is formed on a carrier.

85. A radiation sensitive indicator wherein a radiation sensitive layer containing at least the microcapsules according to claim 9 is formed on a carrier.

86. A radiation sensitive indicator wherein a radiation sensitive layer containing at least the microcapsules according to claim 10 is formed on a carrier.

87. A radiation sensitive indicator wherein a radiation sensitive layer containing at least the microcapsules according to claim 11 is formed on a carrier.

88. A radiation sensitive indicator wherein a radiation sensitive layer containing at least the microcapsules according to claim 12 is formed on a carrier.

89. A radiation sensitive indicator wherein a radiation sensitive layer containing at least the microcapsules according to claim 13 is formed on a carrier.

90. A radiation sensitive indicator wherein a radiation sensitive layer containing at least the microcapsules according to claim 14 is formed on a carrier.

91. A radiation sensitive indicator wherein a radiation sensitive layer containing at least the microcapsules according to claim 15 is formed on a carrier.

92. A radiation sensitive indicator wherein a radiation sensitive layer containing at least the microcapsules according to claim 16 is formed on a carrier.

93. A radiation sensitive indicator wherein a radiation sensitive layer containing at least the microcapsules according to claim 17 is formed on a carrier.

94. A radiation sensitive indicator wherein a radiation sensitive layer containing at least the microcapsules according to claim 18 is formed on a carrier.

95. A radiation sensitive indicator wherein a radiation sensitive layer containing at least the microcapsules according to claim 19 is formed on a carrier.

96. A radiation sensitive indicator wherein a radiation sensitive layer containing at least the microcapsules according to claim 20 is formed on a carrier.

97. A radiation sensitive indicator wherein a radiation sensitive layer containing at least the microcapsules according to claim 21 is formed on a carrier.

98. A radiation sensitive indicator wherein a radiation sensitive layer containing at least the microcapsules according to claim 22 is formed on a carrier.

99. A radiation sensitive indicator wherein a radiation sensitive layer containing at least the microcapsules according to any one of the claim 1 and an ultraviolet light absorption layer and/or a visible light absorption layer is formed on a carrier.

100. A radiation sensitive indicator wherein a radiation sensitive layer containing at least the microcapsules according to any one of the claim 2 and an ultraviolet light absorption layer and/or a visible light absorption layer is formed on a carrier.

101. A radiation sensitive indicator wherein a radiation sensitive layer containing at least the microcapsules according to any one of the claim 3 and an ultraviolet light absorption layer and/or a visible light absorption layer is formed on a carrier.

102. A radiation sensitive indicator wherein a radiation sensitive layer containing at least the microcapsules according to any one of the claim 4 and an ultraviolet light absorption layer and/or a visible light absorption layer is formed on a carrier.

103. A radiation sensitive indicator wherein a radiation sensitive layer containing at least the microcapsules according to any one of the claim 5 and an ultraviolet light absorption layer and/or a visible light absorption layer is formed on a carrier.

104. A radiation sensitive indicator wherein a radiation sensitive layer containing at least the microcapsules according to any one of the claim 6 and an ultraviolet light absorption layer and/or a visible light absorption layer is formed on a carrier.

105. A radiation sensitive indicator wherein a radiation sensitive layer containing at least the microcapsules according to any one of the claim 7 and an ultraviolet light absorption layer and/or a visible light absorption layer is formed on a carrier.

106. A radiation sensitive indicator wherein a radiation sensitive layer containing at least the microcapsules according to any one of the claim 8 and an ultraviolet light absorption layer and/or a visible lights absorption layer is formed on a carrier.

107. A radiation sensitive indicator wherein a radiation sensitive layer containing at least the microcapsules according to any one of the claim 9 and an ultraviolet light absorption layer and/or a visible light absorption layer is formed on a carrier.

108. A radiation sensitive indicator wherein a radiation sensitive layer containing at least the microcapsules according to any one of the claim 10 and an ultraviolet light absorption layer and/or a visible light absorption layer is formed on a carrier.

109. A radiation sensitive indicator wherein a radiation sensitive layer containing at least the microcapsules according to any one of the claim 11 and an ultraviolet light absorption layer and/or a visible light absorption layer is formed on a carrier.

110. A radiation sensitive indicator wherein a radiation sensitive layer containing at least the microcapsules according to any one of the claim 12 and an ultraviolet light absorption layer and/or a visible light absorption layer is formed on a carrier.

111. A radiation sensitive indicator wherein a radiation sensitive layer containing at least the microcapsules according to any one of the claim 13 and an ultraviolet light absorption layer and/or a visible light absorption layer is formed on a carrier.

112. A radiation sensitive indicator wherein a radiation sensitive layer containing at least the microcapsules according to any one of the claim 14 and an ultraviolet light absorption layer and/or a visible light absorption layer is formed on a carrier.

113. A radiation sensitive indicator wherein a radiation sensitive layer containing at least the microcapsules according to any one of the claim 15 and an ultraviolet light absorption layer and/or a visible light absorption layer is formed on a carrier.

114. A radiation sensitive indicator wherein a radiation sensitive layer containing at least the microcapsules according to any one of the claim 16 and an ultraviolet light absorption layer and/or a visible light absorption layer is formed on a carrier.

115. A radiation sensitive indicator wherein a radiation sensitive layer containing at least the microcapsules according to any one of the claim 17 and an ultraviolet light absorption layer and/or a visible light absorption layer is formed on a carrier.

116. A radiation sensitive indicator wherein a radiation sensitive layer containing at least the microcapsules according to any one of the claim 18 and an ultraviolet light absorption layer and/or a visible light absorption layer is formed on a carrier.

117. A radiation sensitive indicator wherein a radiation sensitive layer containing at least the microcapsules according to any one of the claim 19 and an ultraviolet light absorption layer and/or a visible light absorption layer is formed on a carrier.

118. A radiation sensitive indicator wherein a radiation sensitive layer containing at least the microcapsules according to any one of the claim 20 and an ultraviolet light absorption layer and/or a visible light absorption layer is formed on a carrier.

119. A radiation sensitive indicator wherein a radiation sensitive layer containing at least the microcapsules according to any one of the claim 21 and an ultraviolet light absorption layer and/or a visible light absorption layer is formed on a carrier.

120. A radiation sensitive indicator wherein a radiation sensitive layer containing at least the microcapsules according to any one of the claim 22 and an ultraviolet light absorption layer and/or a visible light absorption layer is formed on a carrier.

121. A radiation detecting method for detecting radiation on a substrate onto which the radiation sensitive indicator according to any of claims 46–111 in the alternative, has been attached.

* * * * *